US006937769B2

(12) United States Patent
Onno

(10) Patent No.: US 6,937,769 B2
(45) Date of Patent: Aug. 30, 2005

(54) DECODING OF DIGITAL DATA

(75) Inventor: Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 827 days.

(21) Appl. No.: 09/983,877

(22) Filed: Oct. 26, 2001

(65) Prior Publication Data

US 2002/0051504 A1 May 2, 2002

(30) Foreign Application Priority Data

Oct. 27, 2000 (FR) .......................................... 00 13880

(51) Int. Cl.[7] .................................................. G06K 9/36

(52) U.S. Cl. ....................................... 382/233; 382/190

(58) Field of Search .......................... 375/340; 711/119, 711/146, 145, 156; 725/151; 348/448, 452, 699; 340/7.21; 382/317, 309, 190, 233; 386/42, 54, 113; 369/14, 18

(56) References Cited

U.S. PATENT DOCUMENTS

| | | | | | |
|---|---|---|---|---|---|
| 5,774,583 | A | * | 6/1998 | Sasaki et al. | 382/190 |
| 6,201,902 | B1 | * | 3/2001 | Sasaki et al. | 382/309 |
| 6,260,120 | B1 | * | 7/2001 | Blumenau et al. | 711/152 |
| 6,269,484 | B1 | * | 7/2001 | Simsic et al. | 725/151 |
| 6,574,709 | B1 | * | 6/2003 | Skazinski et al. | 711/119 |

FOREIGN PATENT DOCUMENTS

| | | | |
|---|---|---|---|
| EP | 0 713 334 A2 | 5/1996 | H04N/5/907 |
| EP | 0 805 593 A2 | 11/1997 | H04N/7/173 |
| EP | 0 971 544 A2 | 1/2000 | H04N/7/26 |
| WO | WO 99/49412 | 9/1999 | G06K/9/00 |

OTHER PUBLICATIONS

*de Queiroz, et al.*, "Wavelet Transforms in a JPEG–Like Image Coder," IEEE Transactions on Circuits and Systems for Video Technology, vol. 7, No. 2, pp. 419–424, Apr. 1, 1997.

*Huh, et al.*, "The New Extended JPEG Coder with Variable Quantizer Using Block Wavelet Transform," IEEE Transactions on Consumer Electronics, vol. 43, No. 3, pp. 401–409, Aug. 1997.

*Topiwala, et al.*, "Local Zerotree Coding," IEEE 1999, pp. 279–282, Oct. 1999.

*Hsu, et al.*, "WaveNet Processing Brassboards for Live Video via Radio," Journal of Electronic Imaging vol. 7, No. 4, pp. 755–769, Oct. 1998.

*Eom, et al.*, "A Block Wavelet Transform for Sub–Image Coding/Decoding," proceedings of the SPIE, vol. 2669, pp. 169–177, 2000.

* cited by examiner

*Primary Examiner*—Anh Hong Do
(74) *Attorney, Agent, or Firm*—Fitzpatrick, Cella, Harper & Scinto

(57) ABSTRACT

Method of decoding a set of data representing physical quantities, the data previously having been coded by the steps of formation of blocks and coding of these blocks into codeblocks, these codeblocks being included in a binary stream, characterized in that it includes the steps of:

Figure 1:
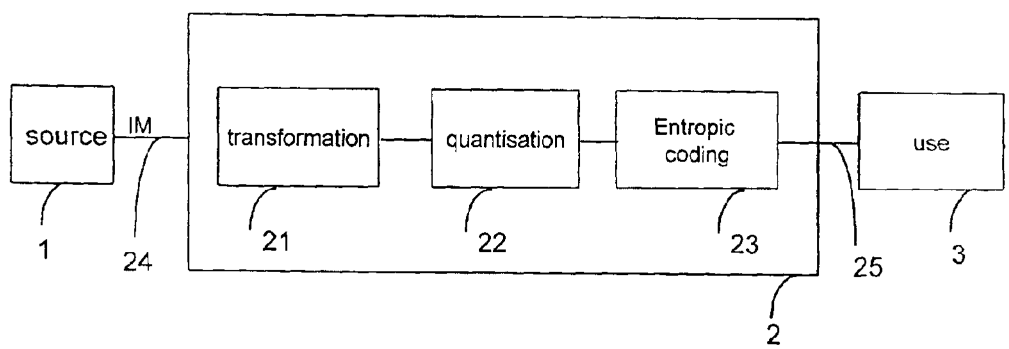

reading (E1) a request defining the set of data to be decoded, analyzing (E3) the request in order to determine a first subset of codeblocks to be decoded and a second subset which has previously been decoded and stored, extracting (E10, E12) the codeblocks of the first subset, decoding (E14) the extracted codeblocks.

29 Claims, 12 Drawing Sheets

DECODING OF DIGITAL DATA

The present invention concerns a method of decoding a coded digital signal.

The invention applies notably in the field of image processing.

In the context of the standard JPEG2000, currently being drafted, the structure of the internal data is such that a user can have access to part of a coded image, called a sub-image, without having to decode the entire image.

This is advantageous since the user obtains the sub-image which he requires more rapidly than if he had to decode the entire image.

The decoding of a sub-image is made possible because of the structure of the data or samples constituting the coded image and which are organised in blocks, each block constituting a base unit for the coding of the image.

Because of this, it is possible to have access more rapidly to the sub-image selected by the user by extracting and decoding only the base blocks corresponding to this sub-image.

The Applicant found that this processing could be extended to the case of a coded digital signal which is not necessarily a coded image and which includes a set of samples obtained by coding an original set of samples representing physical quantities.

Such a digital signal can for example be a sound signal.

The present invention aims to provide a method and a device which make it possible to decode a set of data rapidly.

To this end, the invention proposes a method of decoding a set of data representing physical quantities, the data previously having been coded by the steps of formation of blocks and coding of these blocks into codeblocks, these codeblocks being included in a binary stream, characterised in that it includes the steps of:

- reading a request defining the set of codeblocks to be decoded,
- analysing the request in order to determine a first subset of codeblocks to be decoded and a second subset which has previously been decoded and stored,
- extracting the codeblocks of the first subset,
- decoding the extracted codeblocks.

The invention also proposes a method of decoding a set of data representing physical quantities, the data previously having been coded by the steps of transformation into frequency sub-bands, formation of blocks and coding of these blocks into codeblocks, these codeblocks being included in a binary stream, characterised in that it includes the steps of:

- reading a request defining the set of data to be decoded,
- analysing the request in order to determine a first subset of data to be decoded and a second subset which has previously been decoded and stored,
- projecting the first subset to be decoded onto the frequency sub-bands in order to determine the corresponding codeblocks,
- extracting the previously determined codeblocks,
- decoding the extracted codeblocks,
- reverse transformation of the decoded codeblocks so as to form a first decoded subset.

Correlatively, the invention concerns a device for decoding a set of data representing physical quantities, the data previously having been coded by means of forming blocks and coding these blocks into codeblocks, these codeblocks being included in a binary stream, characterised in that it has:

- means of reading a request defining the set of data to be decoded,
- means of analysing the request in order to determine a first subset of codeblocks to be decoded and a second subset which has previously been decoded and stored,
- means of extracting the codeblocks of the first subset,
- means of decoding the extracted codeblocks.

The invention also concerns a device for decoding a set of data representing physical quantities, the data previously having been coded by means of transforming into frequency sub-bands, forming blocks and coding these blocks into codeblocks, these codeblocks being included in a binary stream, characterised in that it has:

- means of reading a request defining the set of data to be decoded,
- means of analysing the request in order to determine a first subset of data to be decoded and a second subset which has previously been decoded and stored,
- means of projecting the first subset to be decoded onto the frequency sub-bands in order to determine the corresponding codeblocks,
- means of extracting the previously determined codeblocks,
- means of decoding the extracted codeblocks,
- means of reverse transformation of the decoded codeblocks so as to form a first decoded subset.

Thus, by virtue of the invention, the decoding of a set of data is effected by reusing previously decoded data, which limits the redundancy of the processing. The decoding is thus more rapid.

The invention is particularly advantageous in the case of a client-server application, since the data exchanges are reduced between the client and the server.

According to a preferred characteristic, the decoding method also includes a step of concatenating the first decoded subset with the second subset.

Thus the entire set of decoded data is finally found.

According to a preferred characteristic, the analysis of the request takes into account the dimension, the position, the resolution and the quality of the set of data to be decoded.

The invention applies in fact to different requests, so as to process various choices of the user with regard to the resolution, the quality, the size and the position of the set of data. This set of data can notably be a sub-image defined by the user in an image.

According to a preferred characteristic, the projection of the first subset to be decoded is effected on frequency sub-bands which are selected according to the resolution of the set of data to be decoded.

It is thus possible to zoom in on the required data.

According to a preferred characteristic, a codeblock is extracted from a memory or from the binary stream.

If a codeblock has already been used and stored during a previous decoding operation, it is possible to find it in memory, without making a search in the binary stream. Here too, this is particularly advantageous for an organisation of the client-server type.

In another aspect, the decoding method includes the steps of:

- checking whether a first request is currently being processed when a second request is detected,
- checking whether or not the processing of the first request has exceeded an advancement threshold, if a first request currently being processed is detected, stopping the processing of the first request, if the processing has not passed the advancement threshold, awaiting the end of the processing of the first request, if the processing has passed the advancement threshold, processing the second request.

Thus the last current request is processed as rapidly as possible, which increases the decoding speed for the user.

In another aspect, the decoding method includes the steps of:

storing the extracted codeblocks in memory, eliminating from the memory codeblocks whose frequency of use is low, if the memory is full.

These characteristics make it possible to manage a memory of fixed size.

The invention also concerns a display method including the previously disclosed decoding method and a step of displaying the set of decoded data.

The invention concerns a display device having means of implementing the above characteristics.

The display method and device have advantages similar to those previously described.

The invention also concerns a digital apparatus including the decoding or display device, or means of implementing the method according to the invention. This digital apparatus is for example a digital photographic apparatus, a digital camcorder or a scanner. The advantages of the device and of the digital apparatus are identical to those previously disclosed.

The invention also concerns an information storage means which can be read by a computer or by a microprocessor, integrated or not into the device, possibly removable, storing a program implementing the method according to the invention.

The invention also concerns a computer program on a storage medium and comprising computer executable instructions for causing a computer to decode a set of data according to the previously disclosed method.

Figure 2:
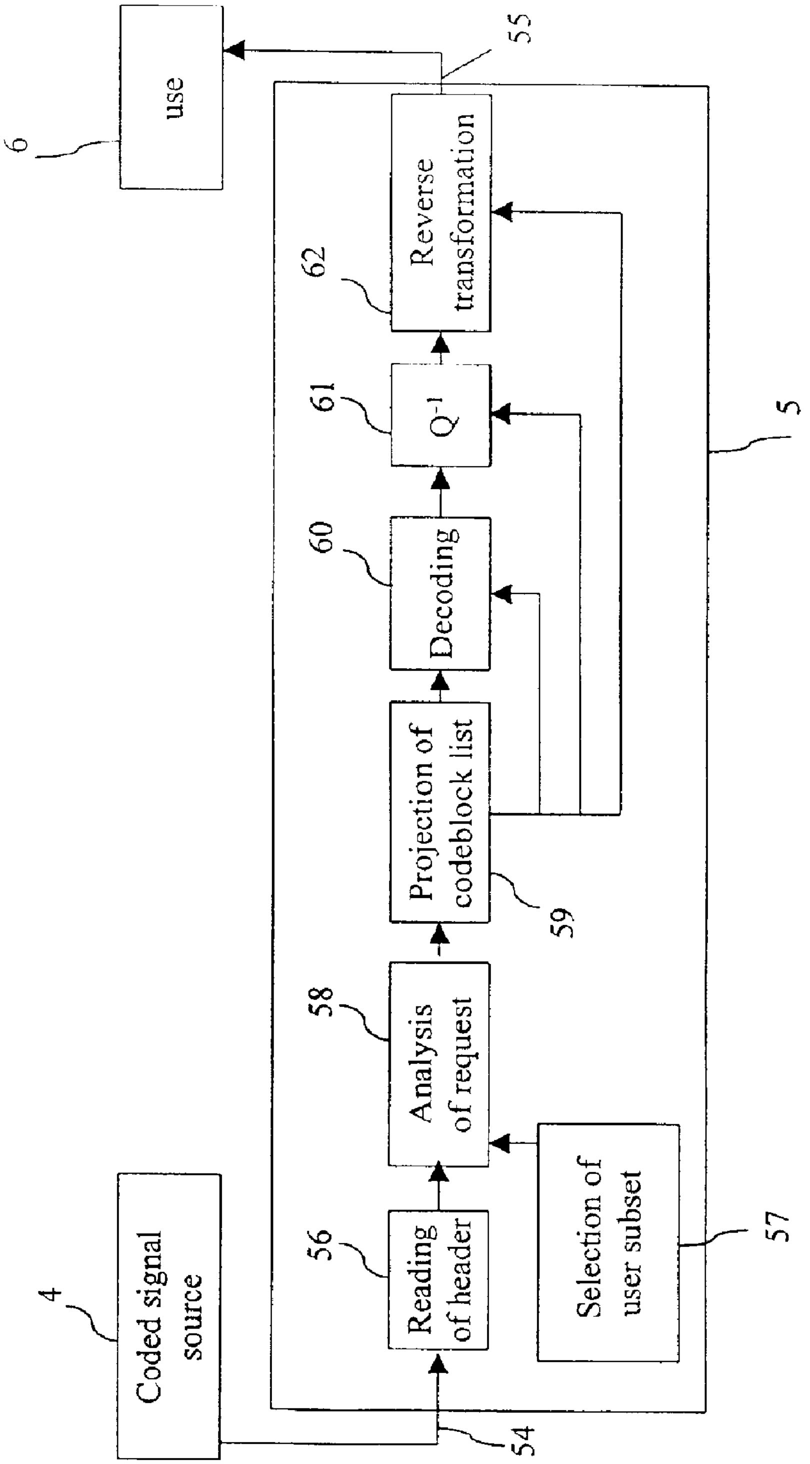
Figure 3:
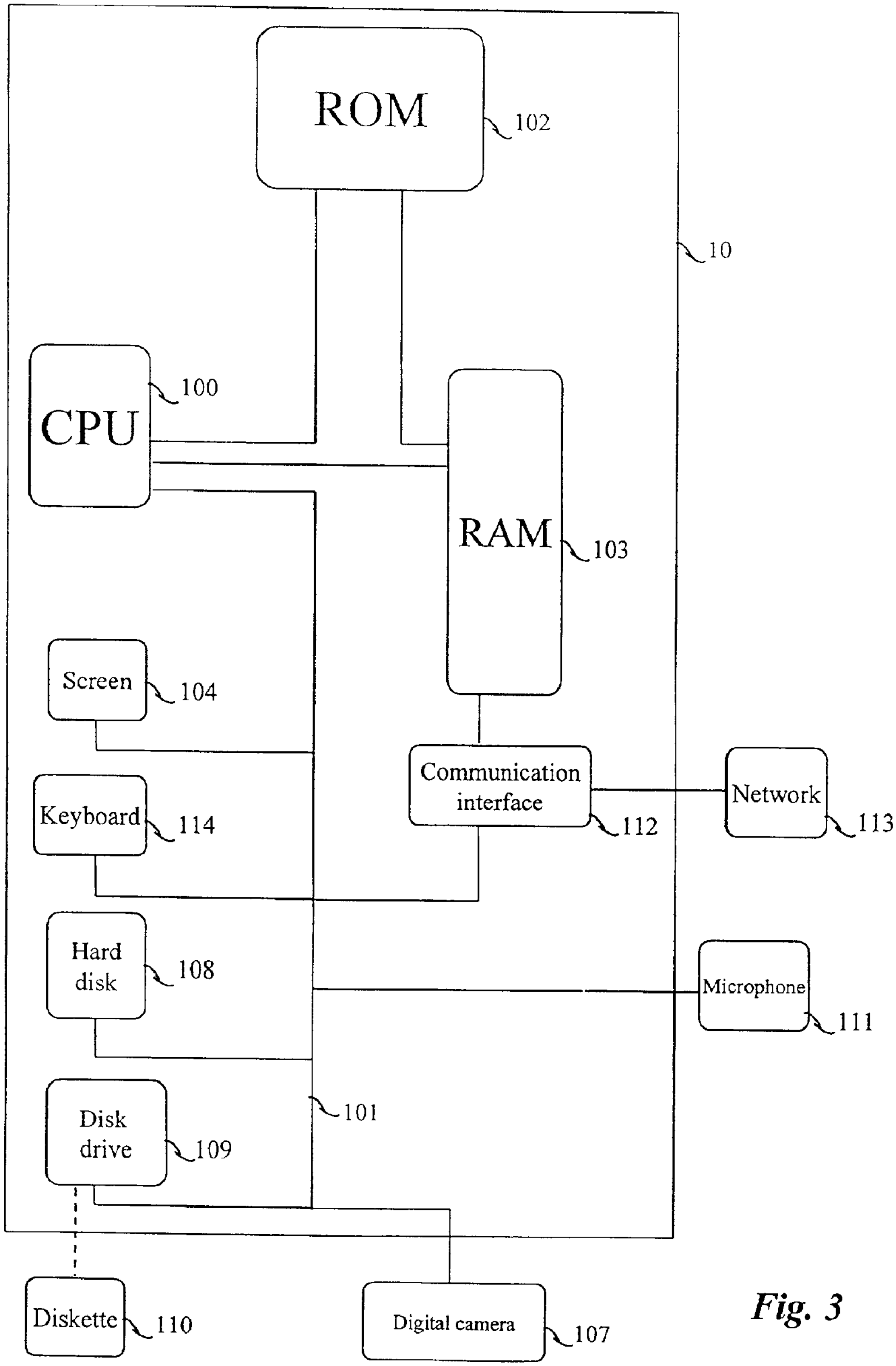
Figure 4:
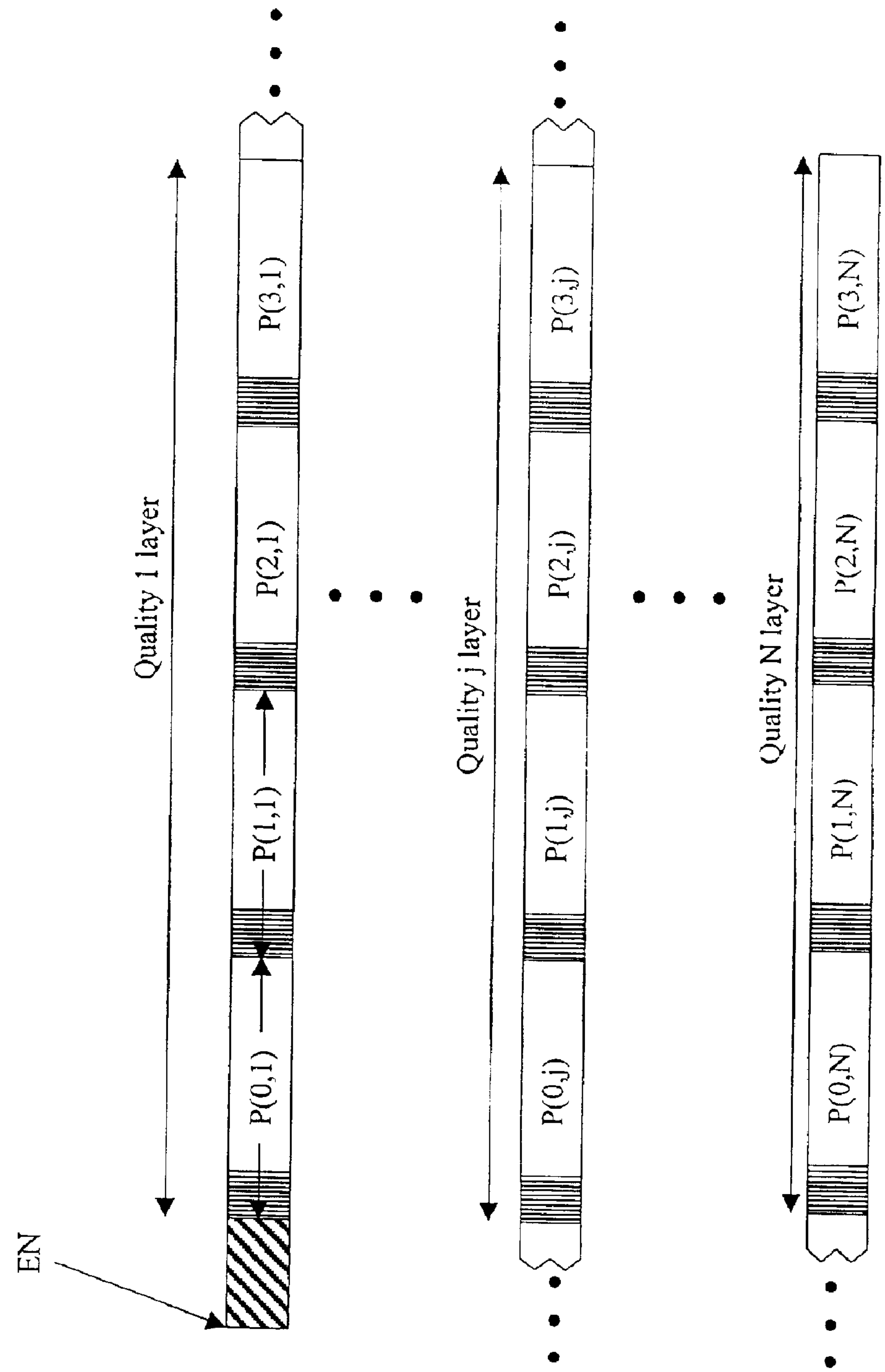
Figure 5:
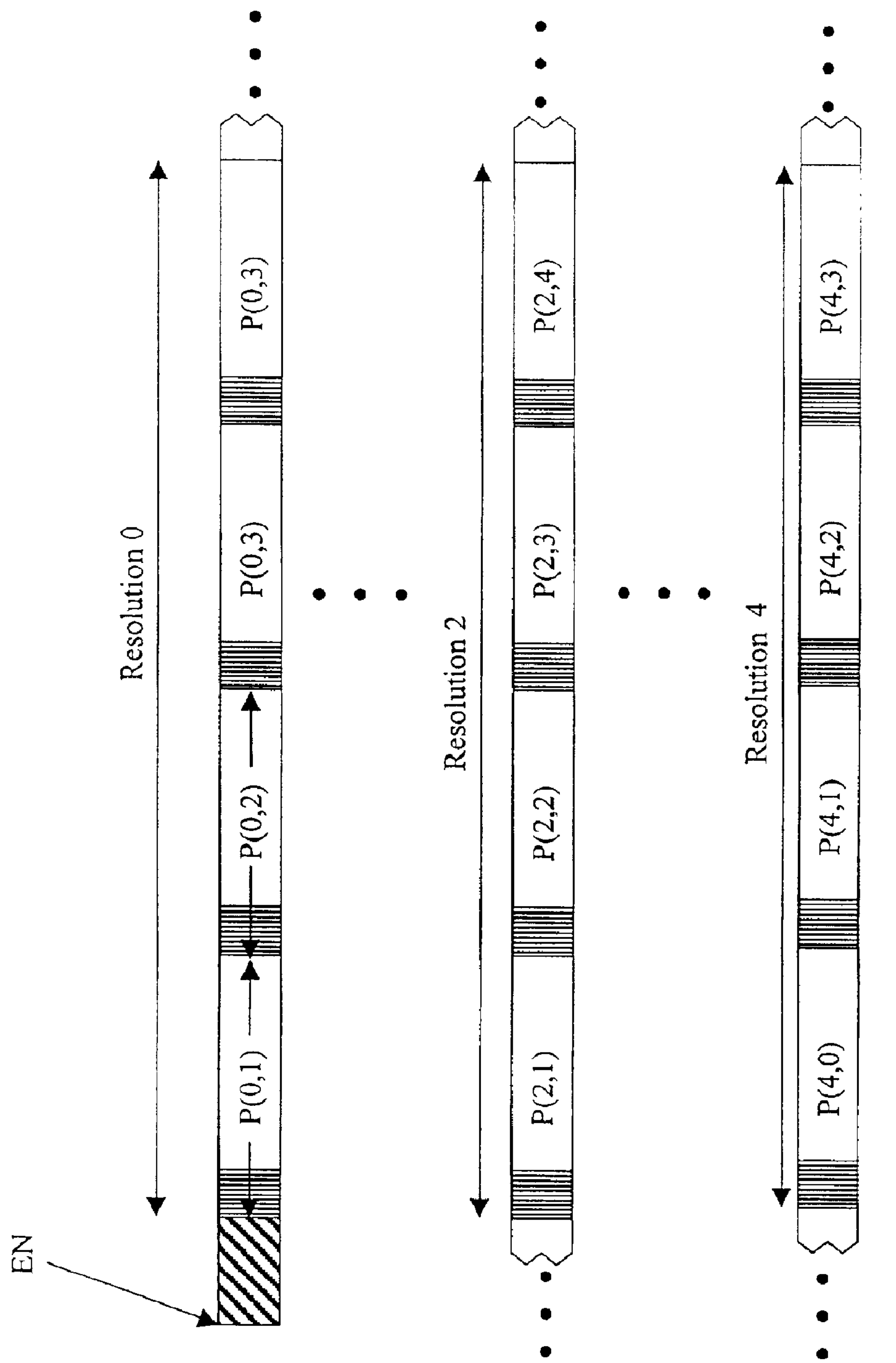
Figure 6:
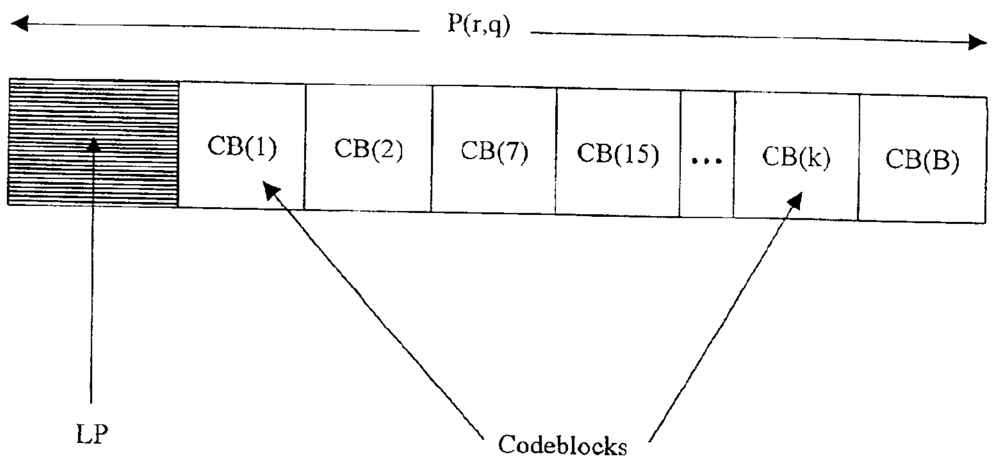
Figure 7:
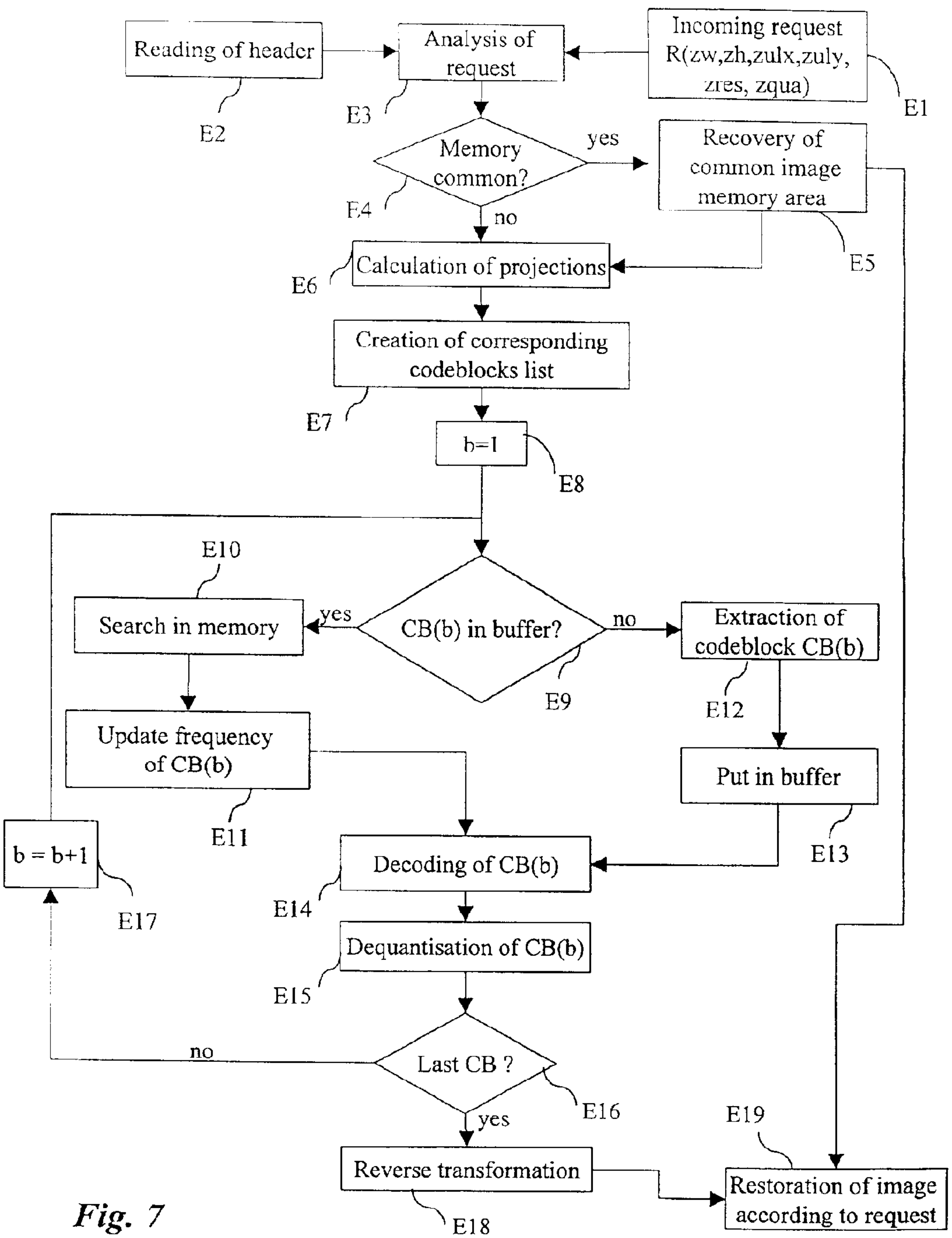
Figure 8:
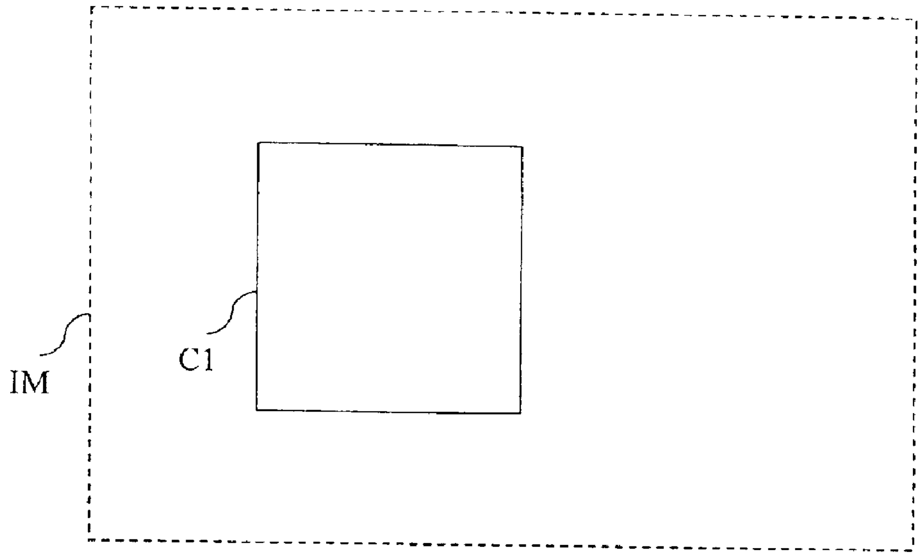
Figure 9:
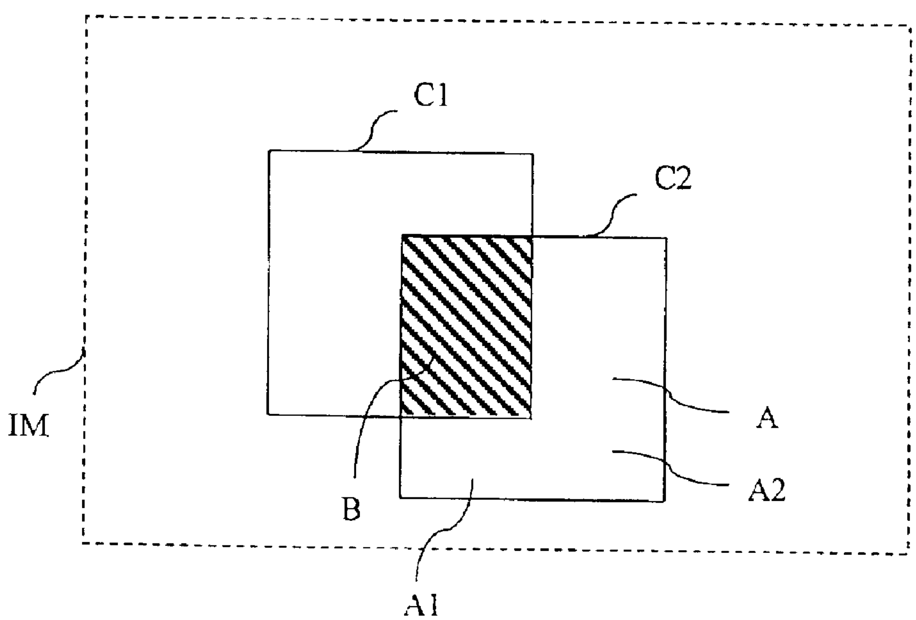
Figure 10:
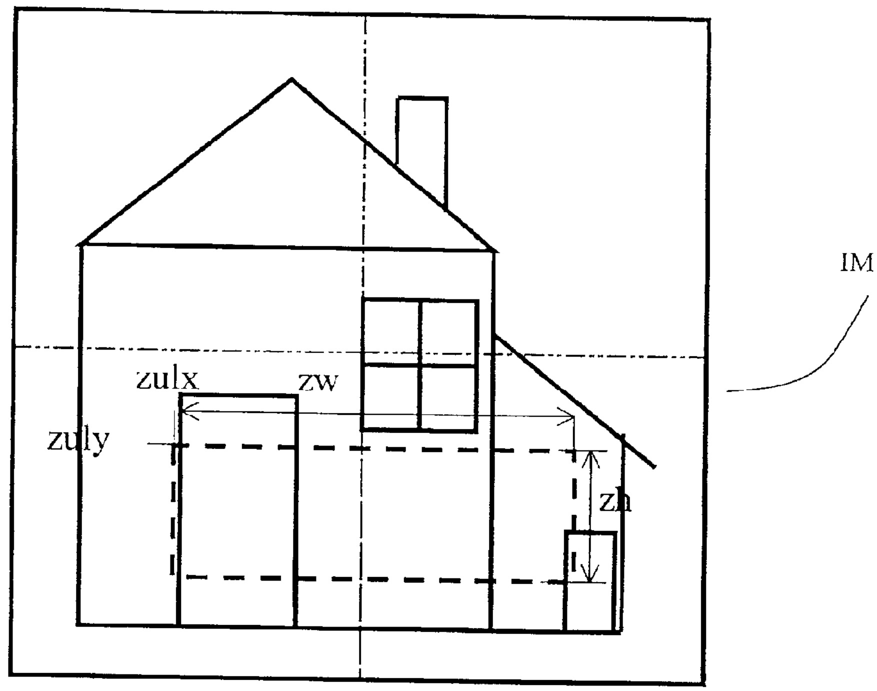
Figure 11:
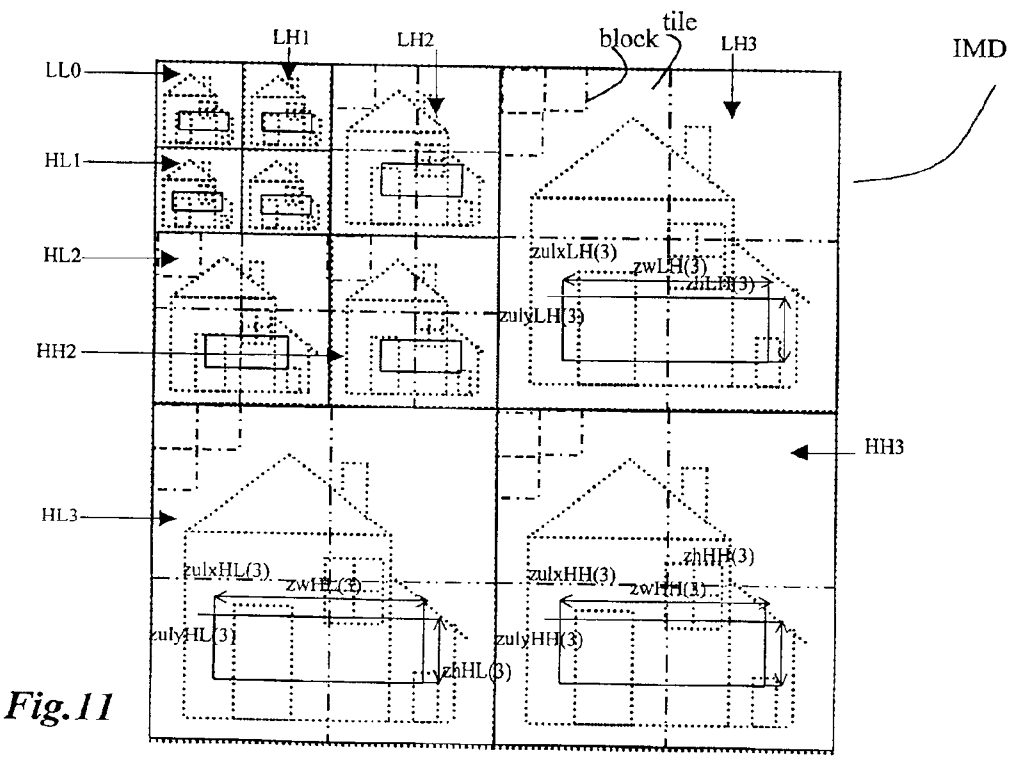
Figure 12:
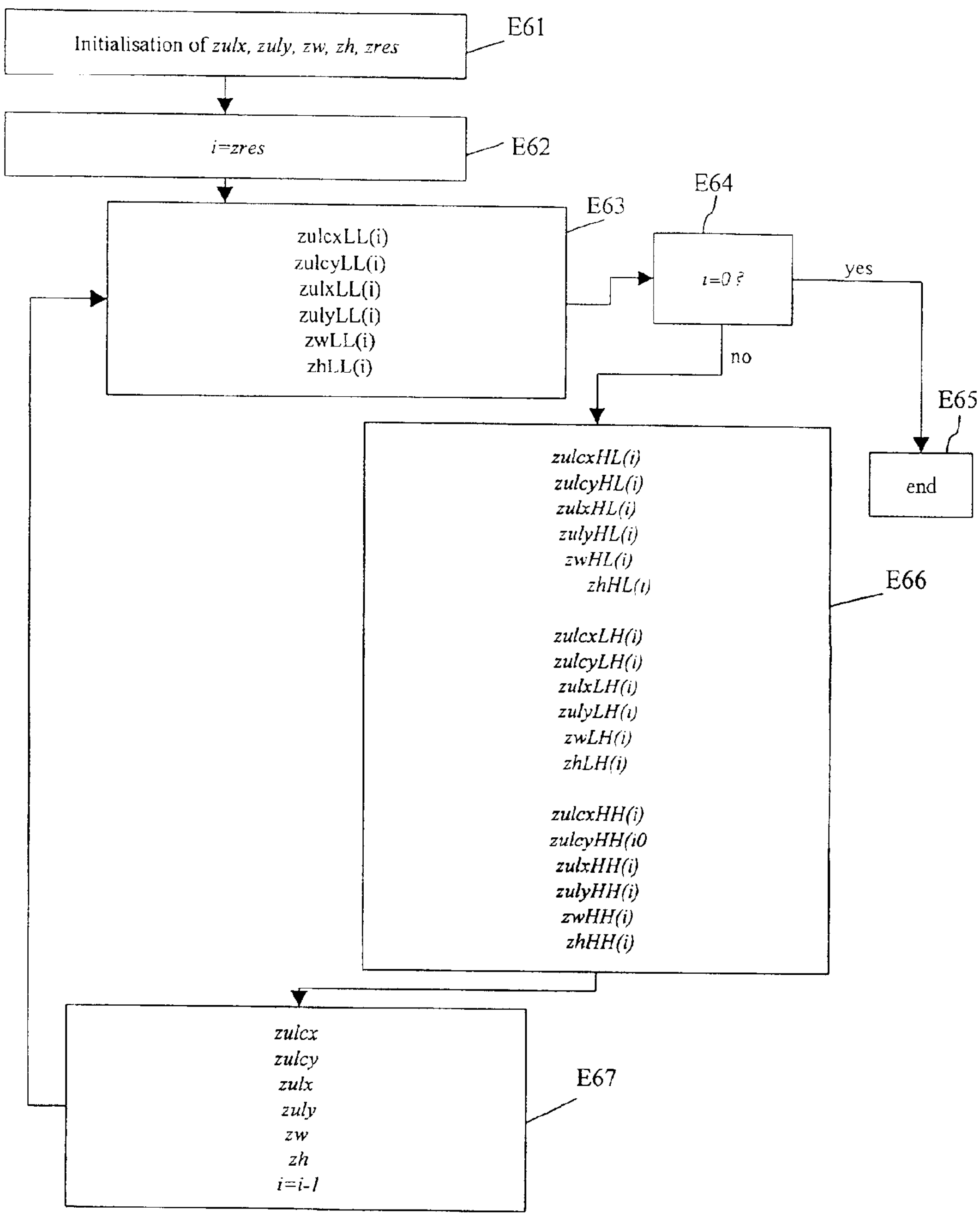
Figure 13:
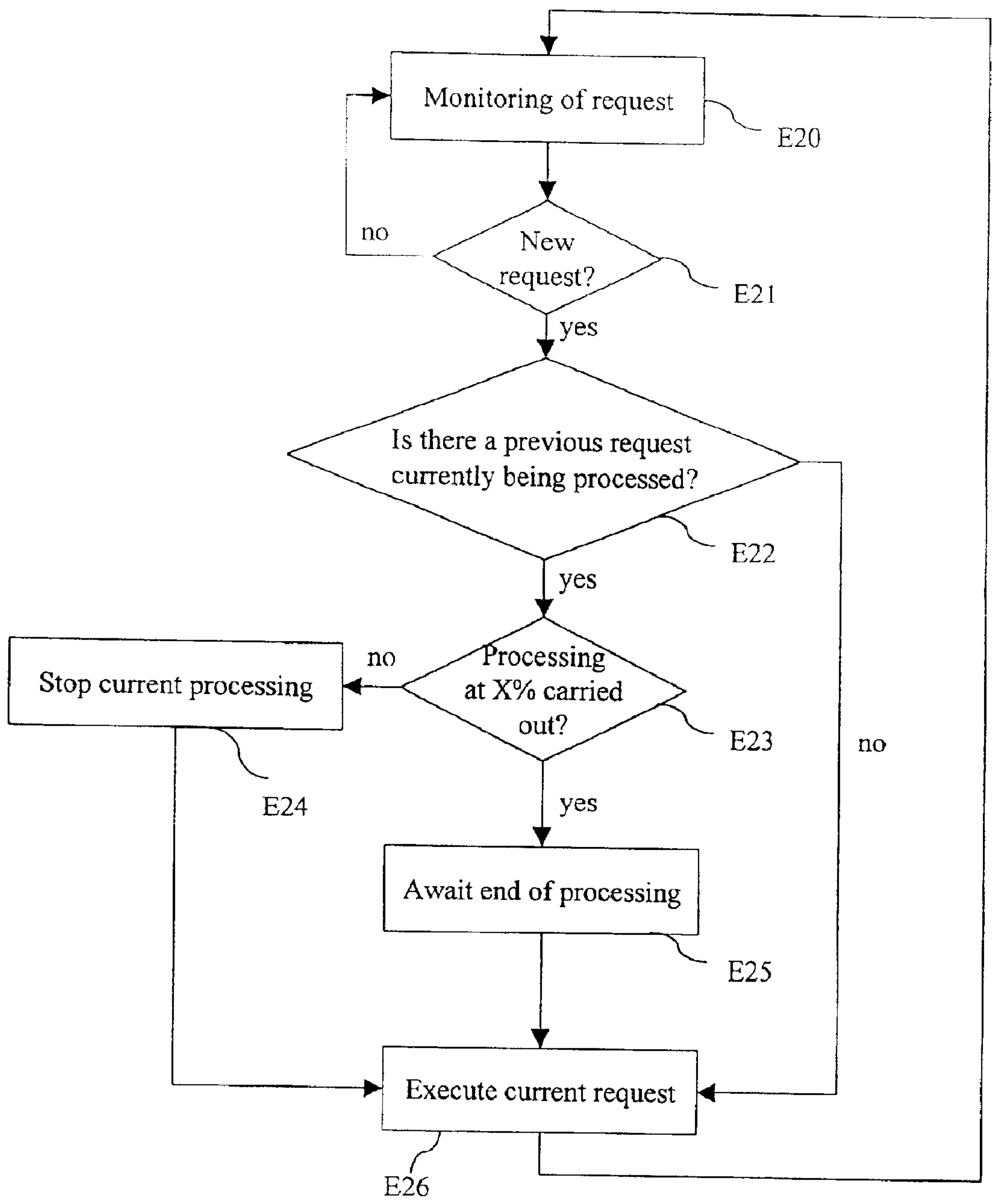
Figure 14:
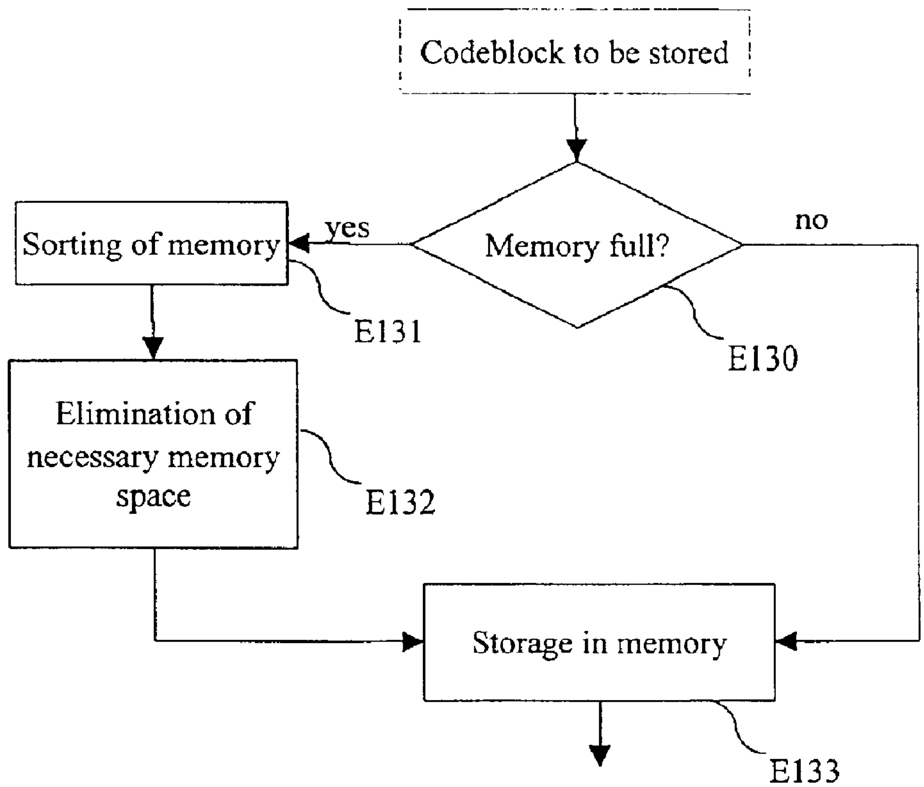

The characteristics and advantages of the present invention will emerge more clearly from a reading of a preferred embodiment illustrated by the accompanying drawings, in which:

FIG. 1 depicts an embodiment of a digital data coding device,

FIG. 2 depicts an embodiment of a data decoding device according to the invention, FIG. 3 depicts an embodiment of a device according to the invention, FIGS. 4 and 5 depict the organisation of a binary stream containing the coded data, FIG. 6 depicts the organisation of a packet of data included in the binary stream of FIG. 4 or 5, FIG. 7 depicts an embodiment of a method of decoding coded data according to the invention, FIG. 8 depicts an area to be decoded in an image, FIG. 9 depicts two areas to be decoded in an image, FIG. 10 depicts an image before coding, FIG. 11 depicts the decomposition of the previous image into frequency sub-bands, FIG. 12 depicts an embodiment of the projection of an area to be decoded onto the frequency sub-bands, included in the algorithm of FIG. 7, FIG. 13 depicts an embodiment of request management according to the invention, FIG. 14 depicts a method of carrying out storage included in the algorithm in FIG. 7.

According to a chosen embodiment depicted in FIG. 1, a data coding device is a device 2 which has an input 24 to which a source 1 of non-coded data is connected.

The source 1 has for example a memory means, such as a random access memory, hard disk, diskette or compact disc, for storing non-coded data, this memory means being associated with an appropriate reading means for reading the data therein. A means for recording the data in the memory means can also be provided.

It will be considered more particularly hereinafter that the data to be coded are a series of original digital samples representing physical quantities and representing for example an image IM.

The present invention could be applied to a sound signal in which it is wished to decode an extract of a compressed audio signal.

The source 1 supplies a digital image signal IM to the input of the coding circuit 2. The image signal IM is a series of digital words, for example bytes. Each byte value represents a pixel of the image IM, here with 256 levels of grey, or black and white image. The image can be a multispectral image, for example a colour image having components in three frequency bands, of the red-green-blue or luminance and chrominance type. Either the colour image is processed in its entirety, or each component is processed in a similar manner to the monospectral image.

Means 3 using coded data are connected to the output 25 of the coding device 2. The coding device 2 supplies the coded data in the form of a binary stream, two examples of which will be disclosed hereinafter.

The user means 3 include for example means of storing coded data, and/or means of transmitting coded data.

The coding device 2 has conventionally, as from the input 24, a transformation circuit 21 which implements decompositions of the data signal into frequency sub-band signals, so as to effect an analysis of the signal.

The transformation circuit 21 is connected to a quantisation circuit 22. The quantisation circuit implements a quantisation known per se, for example a scalar quantisation or a vector quantisation, of the coefficients, or groups of coefficients, of the frequency sub-band signals supplied by the circuit 21.

The circuit 22 is connected to an entropic coding circuit 23, which effects an entropic coding, for example a Huffman coding, or an arithmetic coding, of the data quantised by the circuit 22.

FIG. 2 depicts a data decoding device 5 according to the invention, the data having been coded by the device 2.

Means 4 using coded data are connected to the input 54 of the decoding device 5. The means 4 include for example means of storing coded data, and/or means of receiving coded data which are adapted to receive the coded data transmitted by the transmission means 3.

Means 6 using decoded data are connected to the output 55 of the decoding device 5. The user means 6 are for example image display means, or sound reproduction means, according to the nature of the data being processed.

The decoding device 5 overall performs operations which are the reverse of those of the coding device 2 except for the first operations.

The device 5 has a circuit 56 for reading all the information representing the original samples and parameters used during coding. This set of information constitutes the header of the coded signal which is applied to the input 54 of the said device.

This circuit 56 makes it possible to read the data concerning the size of the set of original samples (image) constituting the image signal and its resolution, that is to say the number of levels of decomposition of this set into frequency sub-bands.

Where the image signal is partitioned into areas, also referred to as tiles, this circuit reads the data concerning these tiles, namely their number, their width, their height and their position in the image.

The device 5 also has a circuit 57 for selecting a subset of original samples (sub-image) forming part of the set of original samples constituting the image signal.

The selection of this original sub-image is characterised by data concerning the required size, resolution and quality. These data are included in a request.

This selection can be made by means of a graphical interface which will also control, when chosen by the user, the validity of the selected sub-image.

This is because the selected sub-image must have a size less than or equal to that of the image in the resolution in question.

The circuits 56 and 57 are connected to a request analysis circuit 58 which is itself connected to a projection circuit so as to form a list of codeblocks to be decoded.

The functioning of these circuits will be detailed subsequently.

The device 5 also has an entropic decoding circuit 60, which effects an entropic decoding corresponding to the coding of the circuit 23 of FIG. 1. The circuit 60 is connected to a dequantisation circuit 61, corresponding to the quantisation circuit 22. The circuit 61 is connected to a reverse transformation circuit 62, corresponding to the transformation circuit 21. The transformations envisaged here effect a synthesis of the digital signal, from frequency sub-band signals.

The coding device and/or the decoding device can be integrated into a digital apparatus, such as a computer, a printer, a facsimile machine, a scanner or a digital photographic apparatus, for example.

The coding device and the decoding device can be integrated into the same digital apparatus, for example a digital photographic apparatus.

The coding device and the decoding device can be integrated into two distant digital apparatuses, and the invention is then implemented in a first station and the binary stream is stored in a second distant station, the two stations being adapted to communicate with each other.

As depicted in FIG. 3, a device implementing the invention is for example a microcomputer 10 connected to different peripherals, for example a digital camera 107 (or a scanner, or any means of acquiring or storing images) connected to a graphics card and supplying information to be processed according to the invention.

The device 10 has a communication interface 112 connected to a network 113 able to transmit digital data to be processed or conversely to transmit data processed by the device. The device 10 also has a storage means 108 such as for example a hard disk. It also has a drive 109 for a disk 110. This disk 110 can be diskette, a CD-ROM or a DVD-ROM, for example. The disk 110, like the disk 108, can contain data processed according to the invention as well as the program or programs implementing the invention which, once read by the device 10, will be stored in the hard disk 108. According to a variant, the program enabling the device to implement the invention can be stored in a read only memory 102 (referred to as ROM in the drawing). In a second variant, the program can be received and stored in an identical fashion to that described previously by means of the communication network 113.

The device 10 is connected to a microphone 111. The data to be processed according to the invention will in this case be of the audio signal.

This same device has a screen 104 for displaying the data to be processed or serving as an interface with the user, who can thus parameterise certain processing modes, by means of the keyboard 114 or any other means (a mouse for example).

The central unit 100 (referred to as CPU in the drawing) executes the instructions relating to the implementation of the invention, instructions stored in the read only memory 102 or in the other storage elements. On powering up, the processing programs stored in a non-volatile memory, for example the ROM 102, are transferred into the random access memory RAM 103, which will then contain the executable code of the invention as well as registers for storing the variables necessary for implementing the invention.

More generally, an information storage means, which can be read by a computer or by a microprocessor, integrated or not into the device, possibly removable, stores a program implementing the method according to the invention.

The communication bus 101 affords communication between the different elements included in the microcomputer 10 or connected to it. The representation of the bus 101 is not limitative and notably the central unit 100 is able to communicate instructions to any element of the microcomputer 10 directly or by means of another element of the microcomputer 10.

FIGS. 4 to 6 show schematically the binary stream output from the previously disclosed coding device.

As depicted in FIG. 4, the binary stream has a header EN and data packets P(r, q), where r and q are integers representing respectively the resolution and the quality of the packets.

The header EN contains notably the following information: the size of the image, the number of tiles formed therein, the type of filter, the quantisation step and coding parameters. This information is useful during the decoding of the binary stream.

In FIG. 4, the packets are organised in layers. The first layer corresponds to a given quality, for example 0.01 bpp (bits per pixel). The following layers contain additional data and correspond respectively to higher qualities. The representation of the data is then progressive in quality.

In FIG. 5, the packets are organised by resolution. The binary stream then contains, after the header EN, packets grouped by resolution.

It should be noted that these two binary streams contain the same data packets, and that they are differentiated solely by their internal organisation.

It should also be noted that, if the image is decomposed into tiles, the binary stream is organised in a similar manner, the data being grouped together tile by tile.

A data packet P(r, q) is depicted in FIG. 6. This packet contains a list LP of its content and a series of coding data CB for each of the blocks, of resolution r and quality q. The coding data CB for a block are called the codeblock.

The functioning of the decoding device according to the invention will now be described by means of algorithms.

The algorithm in FIG. 7 depicts the general functioning of the decoding device according to the invention and includes steps E1 to E19.

This algorithm can be stored in whole or in part in any information storage means capable of cooperating with the microprocessor. This storage means can be read by a computer or by a microprocessor. This storage means is integrated or not into the device, and may be removable. For example, it may include a magnetic tape, a diskette or a CD-ROM (fixed-memory compact disc).

Step E1 is the reading of a request defining an area or sub-image of an image to be decoded and displayed. FIG. 8 depicts such an area. In this figure, the complete image is denoted IM and the required area is denoted C1. The required area is defined by a user, for example by means of the mouse.

FIG. 9 depicts the required area C1 and a second required area C2. The area C2 has a part B which is common with the area C1 and a part A which is not included in the area C1. The part A can be decomposed into two rectangular parts A1 and A2.

FIG. 9 depicts more particularly a case of movement of an area to be decoded in the image, known by the English term "pan scroll". The invention also applies to cases where the resolution and/or the quality are also modified between two successively defined areas.

Step E2 is the reading of the header of the binary stream in order to read the coding parameters and to determine notably the size of the image, the number of resolution levels on which it has been decomposed and the size of the codeblocks contained in the binary stream.

The following step E3 is the analysis of the request for determining the size, the position, the resolution and the quality of the area to be decoded. The request is also validated, that is to say it is checked whether it is consistent with the information on the coded image which had been read in the header of the binary stream.

The following step E4 is a test for determining whether there is a part of the area which has already been decoded and which is in the image memory, such as the part B (FIG. 9). The purpose of step E4 is to separate the parts such as parts A and B in FIG. 9, in order to process them each in an appropriate manner.

When at least one such part exists, then this part is recovered in memory at step E5. Step E5 is followed by step E6.

When the response is negative at step E4, this is followed by step E6, from which the part (part A in FIG. 9) which is not already in decoded form in memory is processed. This part can itself be processed in the form of several rectangular-shaped sub-parts. Hereinafter, in order to simplify, only one rectangular part will be considered.

At step E6, the part to be decoded is projected into the decomposition of the image into frequency sub-bands. This step will be detailed hereinafter. It results in a set of blocks in the different frequency sub-bands, corresponding to the part of the image to be decoded. The size, position and resolution of the area are taken into account during this step.

The following step E7 is the creation of a list of codeblocks corresponding to the projection carried out at the previous step. These codeblocks correspond to the previously determined blocks. The quality of the required area is taken into account during this step.

The following step E8 is an initialisation for setting a parameter b to one. The parameter b is an integer which represents a codeblock index in the previously created list and which will now be run through.

The following step E9 is a test for checking whether the current codeblock is already stored in a buffer.

If the response is positive, then this step is followed by step E10, at which the codeblock is sought in the memory.

At the following step E11, its frequency of use is updated, for example by incrementing a counter each time this codeblock is used.

If the response is negative at step E9, then the current codeblock is extracted from the binary stream at step E12.

The following step E13 is the storage of the extracted codeblock in the buffer.

Steps E11 and E13 are followed by step E14, at which the current codeblock is decoded.

The following step E15 is a dequantisation of the decoded codeblock. The decoding and dequantisation depend on the coding and quantisation operations carried out during the coding of the image.

The following step E16 is a test for determining whether the current codeblock is the last to be processed. If the response is negative, then this step is followed by step E17, at which the parameter b is incremented by one in order to consider a following codeblock. Step E17 is followed by the previously described step E9.

When the response is positive at step E16, then this step is followed by step E18, at which a reverse transformation is applied to the decoded and dequantised codeblocks. The reverse transformation is a transformation which is the reverse of that which was carried out during the coding of the image.

Steps E18 and E5 are followed by step E19, which is the concatenation of the results of these two steps so as to form the required area. For example, parts A and B (FIG. 9) are concatenated in order to form the area C2. This area is for example displayed.

The projection step E6 will now be detailed.

FIG. 10 depicts schematically a digital image IM output from the image source 1 of FIG. 1.

This figure is decomposed by the transformation circuit 21 of FIG. 1, which is a dyadic decomposition circuit with three decomposition levels.

The circuit 21 is, in this embodiment, a conventional set of filters, respectively associated with decimators by two, which filter the image signal in two directions, into sub-band signals of high and low spatial frequencies. The relationship between a high-pass filter and a low-pass filter is often determined by the perfect signal reconstruction conditions. It should be noted that the vertical and horizontal decomposition filters are not necessarily identical, although in practice this is generally the case. The circuit 21 has here three successive analysis units for decomposing the image IM into sub-band signals on three decomposition levels.

In general terms, the resolution of a signal is the number of samples per unit length used for representing this signal. In the case of an image signal, the resolution of a sub-band signal is related to the number of samples per unit length used for representing this sub-band signal horizontally and vertically. The resolution depends on the number of decompositions effected, the decimation factor and the resolution of the initial image.

The first analysis unit receives the digital image signal SI and, in a known manner, delivers as an output four sub-band signals $LL_3$, $LH_3$, $HL_3$ and $HH_3$ with the highest resolution $RES_3$ in the decomposition.

The sub-band signal $LL_3$ includes the components, or samples, of low frequency, in both directions, of the image signal. The sub-band signal $LH_3$ contains the components of low frequency in a first direction and high frequency in a second direction, of the image signal. The sub-band signal $HL_3$ contains the components of high frequency in the first direction and the components of low frequency in the second direction. Finally, the sub-band signal $HH_3$ contains the components of high frequency in both directions.

Each sub-band signal is a set of real samples (it could also be a case of integers) constructed from the original image, which contains the information corresponding to an orientation which is respectively vertical, horizontal and diagonal of the content of the image, in a given frequency band. Each sub-band signal can be assimilated to an image.

The sub-band signal $LL_3$ is analysed by an analysis unit similar to the previous one in order to supply four sub-band signals $LL_2$, $LH_2$, $HL_2$ and $HH_2$ of resolution level $RES_2$.

Each of the sub-band signals of resolution $RES_2$ also corresponds to an orientation in the image.

The sub-band signal $LL_2$ is analysed by an analysis unit similar to the previous one in order to supply four sub-band signals $LL_0$ (by convention), $LH_1$, $HL_1$, and $HH_1$ of resolution level $RES_1$. It should be noted that the sub-band $LL_0$ forms by itself the resolution $RES_0$.

Each of the sub-band signals of resolution $RES_1$ also corresponds to an orientation in the image.

FIG. 11 depicts the image IMD resulting from the decomposition of the image IM, by the circuit 21, into ten sub-bands and on four resolution levels: $RES_0$, $RES_1$, $RES_2$ and $RES_3$. The image IMD contains as much information as the original image IM, but the information is divided with respect to frequency according to three decomposition levels.

Naturally, the number of decomposition levels, and consequently of sub-bands, can be chosen differently, for example 16 sub-bands on six resolution levels, for a bi-dimensional signal such as an image. The number of sub-bands per resolution level can also be different. In addition, the decomposition may not be dyadic. The analysis and synthesis circuits are adapted to the dimension of the signal processed.

In FIG. 11 the samples issuing from the transformation are ranged sub-band by sub-band.

Moreover, the image IMD is partitioned in blocks, some of which are depicted in FIG. 11.

When an area, or sub-image, is selected, the user specifies the size of this sub-image represented by the notations zw (the width of the sub-image) and zh (the height of the sub-image), as well as the coordinates zulx (the position on the X-axis of the top left hand corner of the sub-image) and zuly (the position on the Y-axis of the top left-hand corner of this sub-image) making it possible to locate this sub-image in the image IM in question (FIG. 10).

The user also specifies the resolution, denoted zres, of the chosen sub-image. The user can, for example, request a sub-image of lower resolution than that of the image in question. Thus, for example, it is possible to be interested solely in the sub-bands $LL_0$, $LH_1$, $HL_1$, $HH_1$, $LL_2$, $LH_2$, $HL_2$ and $HH_2$.

The user also specifies the quality zqual of the chosen sub-image.

As mentioned above, this step can be performed by means of a graphical interface.

The data zw, zh, zulx, zuly, zres and zqual are also stored in registers in the random access memory 106 in FIG. 3.

The projection of the required area onto the frequency sub-bands is depicted in the form of an algorithm depicted in FIG. 12. This algorithm includes a step E61 of initialising the values of the parameters zulx, zuly, zw, zh and zres corresponding to the selected sub-image.

In addition, it should be noted that it is also possible to add the coordinates zulcx (X-axis) and zulcy (Y-axis) corresponding to the coordinates of the image with respect to an original reference frame, in the case where these coordinates are not merged with the origin of the reference frame.

For reasons of simplification, the case will be adopted where the coordinates zulcx and zulcy are merged with the origin of the reference frame.

Step E61 is followed by step E62, during which a parameter i is fixed as being equal to the resolution zres required by the user for the selected sub-image.

In the case concerned here, i is equal to 3.

Step E62 is followed by a step E63, during which, during the first iteration, the size of the sub-image in the sub-band LL(3) is calculated.

During this step, zulcxLL(3), zulxLL(3), zulcyLL(3), zulyLL(3), zwLL(3) and zhLL(3) are thus calculated in the following manner:

$$zulcxLL(3)=zulcx \text{ and } zulcyLL(3)=zulcy$$

(this calculation is simplified given that the terms zulcx and zulcy are equal to zero)

$$zulxLL(3)=E((zulx+1)/2)$$

$$zulyLL(3)=E((zuly+1)/2)$$

$$zwLL(3)=E((zulx+zw+1)/2)-zulxLL(3),$$

where E(a) designates the mathematical function integer part of a $$zhLL(3)=E((zuly+zh+1)/2)-zulyLL(3).$$

The calculations carried out during this step are only intermediate calculations whose results are stored in registers in the memory 106.

During the following step denoted E64, a test is carried out on the parameter i in order to determine whether it is equal to zero.

In the affirmative, step E64 is followed by a step E65 ending the algorithm.

In the negative, step E64 is followed by a step E66 during which a calculation is made of the size of the sub-image selected in the different frequency sub-bands $HL_3$, $LH_3$ and $HH_3$, taking i=3 in the following formulae:

$$zulxHL(i)=E(zulx/2)$$

$$zulyHL(i)=zulyLL(i)$$

$$zulcxHL(i)=zulcx+zwLL(i)$$

$$zulcyHL(i)=zulcy$$

$$zwHL(i)=E((zulx+zw)/2)-zulxHL(i)$$

$$zhHL(i)=zhLL(i)$$

$$zulxLH(i)=zulxLL(i)$$

$$zulyLH(i)=E(zuly/2)$$

$$zulcxLH(i)=zulcx$$

$$zulcyLH(i)=zulcy+zhLL(i)$$

$$zwLH(i)=zwLL(i)$$

$$zhLH(i)=E((zuly+zh)/2)-zulyLH(i)$$

$$zulxHH(i)=zulxHL(i)$$

$$zulyHH(i)=zulyLH(i)$$

$$zulcxHH(i)=zulcxHL(i)$$

$$zulcyHH(i)=zulcyLH(i)$$

$$zwHH(i)=zwHL(i)$$

$$zhHH(i)=zhLH(i).$$

Thus zulcxHL(3), zulxHL(3), zulcyHL(3), zulyHL(3), zwHL(3) and zhHL(3) are calculated, and then zulcxLH(3), zulxLH(3), zulcyLH(3), zulyLH(3), zwLH(3) and zhLH(3).

Next, the size of the sub-image in the sub-band $HH_3$ is calculated, which supplies the elements zulcxHH(3), zulxHH(3), zulcyHH(3), zulyHH(3), zwHH(3) and zhHH (3).

The different elements which have just been calculated during step E66 are transferred to the corresponding sub-bands $HL_3$, $LH_3$ and $HH_3$. These elements are also stored in registers in the random access memory 106 in FIG. 3.

The following step denoted E67 consists of updating the different elements calculated for the low sub-band $LL_3$ with a view to its further decomposition.

The updating is carried out by means of the following equalities:

$$zulx=zulxLL(i)$$

$$zuly=zulyLL(i)$$

$$zulcx=zulcxLL(i)$$

$$zulcy=zulcyLL(i)$$

$$zw=zwLL(i)$$

$$zh=zhLL(i)$$

At the end of this step the parameter i is next decremented to the value 2.

At the following cycle, step E63 leads to the calculation of the size of the sub-image projected in the sub-band $LL_2$ and, during step E66, to the calculation of this same sub-image projected in sub-bands $HL_2$, $LH_2$, $HH_2$.

These calculations are carried out using the formulae presented above during the calculation of the size of the sub-image in the sub-band signals $LL_3$, $LH_3$, $LH_3$ and $HH_3$.

Similarly, step E67 updates the coefficients obtained during the previous calculations of the size of the sub-image projected into the sub-band signals $LL_2$, $HL_2$, $LH_2$ and $HH_2$.

The results of this step are stored in registers in the memory 106.

The parameter i is next decremented to the value 1 and step E63 once again executed calculates the size of the sub-image projected into the sub-band $LL_1$. During step E66, the size of this same sub-image projected into the sub-bands $HL_1$, $LH_1$, $HH_1$ is calculated using the same formulae as before.

The calculations of step E66 lead by themselves to the location of the sub-image selected in the different frequency sub-band signals of the last resolution level, namely $HL_1$, $LH_1$ and $HH_1$.

The step E67 of updating the coefficients and decrementing i to 0 is followed by step E63, which calculates the size of the sub-image projected into the low sub-band of the last resolution level $LL_0$.

The result issuing from this step makes it possible to locate the sub-image selected in the low sub-band $LL_0$ of the image in question by marking its position in the latter (FIG. 11).

Step E63 is then followed by step E64 and step E65 ending the algorithm.

The algorithm in FIG. 13 depicts the general functioning of the request management and includes steps E20 to E26.

This algorithm can be stored in whole or in part in any information storage means capable of cooperating with the microprocessor. This storage means can be read by a computer or by a microprocessor. This storage means is integrated or not into the device, and may be removable. For example, it may include a magnetic tape, a diskette or a CD-ROM (fixed-memory compact disc).

Step E20 is a request monitoring step. This step is followed by step E21, which is a test for determining whether a new request is detected. As long as the response is negative, then step E21 is followed by step E20.

When there is a new request, then step E21 is followed by step E22, which is a test for determining whether there is a previous request which is currently being processed.

If the response is positive at step E22, then this step is followed by step E23, which is a test for determining whether the processing of the previous request currently being processed has passed an advancement threshold.

If the response is negative, then this step is followed by step E24, at which the processing of the previous request currently being processed is interrupted.

If the response is positive, then step E23 is followed by step E25, which is a step of awaiting the end of processing of the previous request currently being processed.

Steps E22, E24 and E25 are followed by step E26, which is the execution of the request which had been detected at step E21. This execution includes the execution of the previously described steps E1 to E19. Step E26 is followed by the previously described step E20.

Step E13 of putting the current codeblock in the buffer is detailed in FIG. 14 in the form of an algorithm including steps E130 to E133. These steps are run through when a codeblock is to be stored.

Step E130 is a test for checking whether the buffer is full. If the response is positive, then this step is followed by step E131, which is a sorting of the codeblocks stored in the memory according to a criterion. This criterion is for example the number of use of each codeblock.

The following step E132 is the elimination of the number of codeblocks necessary for releasing sufficient memory space in order to be able to store the codeblock to be stored. The codeblocks which are eliminated are those which have been used least often.

If the response is negative at step E130, this step is followed by step E133. Likewise, step E132 is followed by step E133.

Step E133 is the storage proper of the codeblock to be stored in the buffer.

Naturally, the present invention is in no way limited to the embodiments described and depicted, but quite the contrary encompasses any variant within the capability of an expert.

It should be noted that the processing which has been described applies in a similar fashion to an image which has been decomposed into tiles during its coding.

What is claimed is:

1. A method of decoding a set of data representing physical quantities, the data previously having been coded by the steps of forming blocks and coding the blocks into codeblocks being included in a binary stream, the method comprising the steps of:

reading a request defining a set of codelocks to be decoded;

analyzing the request in order to determine a first subset of codeblocks to be decoded and a second subset which has previously been decoded and stored;

extracting the codeblocks of the first subset; and decoding the extracted codeblocks into a decoded subset.

2. A method of decoding a set of data representing physical quantities, the data previously having been coded by the steps of transforming the data into frequency sub-bands, forming blocks and coding the blocks into codeblocks being included in a binary stream, the method comprising the steps of:

reading a request defining a set of data to be decoded;

analyzing the request in order to determine a first subset of data to be decoded and a second subset which has previously been decoded and stored;

projecting the first subset to be decoded onto the frequency sub-bands in order to determine corresponding codeblocks;

extracting the previously determined codeblocks;

decoding the extracted codeblocks; and reverse transforming the decoded codeblocks so as to form a decoded subset.

3. A decoding method according to claim 1 or 2, further comprising a step of concatenating the decoded subset with the second subset.

4. A decoding method according to claim 1 or 2, wherein said analyzing step analyzes the request based on the dimension, the position, the resolution and the quality of the set of data to be decoded.

5. A decoding method according to claim 2, wherein said projecting step is effected onto frequency sub-bands which are selected according to the resolution of the set of data to be decoded.

6. A decoding method according to claim 1 or 2, wherein said extraction step is effected from a memory or from the binary stream.

7. A decoding method according to claim 1 or 2, further comprising the steps of:

checking whether a first request is currently being processed when a second request is detected;

checking whether or not the processing of the first request has exceeded an advancement threshold, if a first request currently being processed is detected;

stopping the processing of the first request, if the processing has not passed the advancement threshold;

awaiting the end of the processing of the first request, if the processing has passed the advancement threshold; and processing the second request.

8. A decoding method according to claim 1 or 2, further comprising the steps of:

putting the extracted codeblocks in a memory; and eliminating from the memory codeblocks whose frequency of use is low, if the memory is full.

9. A display method comprising the decoding method according to claim 1 or 2 and further comprising a step of displaying the set of decoded data.

10. A method according to claim 1 or 2, wherein the method is implemented in a first station and the binary stream is stored in a second distant station, the two stations being adapted to communicate with each other.

11. A digital signal processing apparatus comprising means adapted to implement the method of decoding according to claim 1 or 2.

12. A storage medium storing a program for implementing the method according to claim 1 or 2.

13. A storage medium according to claim 12, wherein said storage medium is detachably mountable on a device for decoding a set of data representing physical quantities.

14. A storage medium according to claim 12, wherein said storage medium is a floppy disk or a CD-ROM.

15. A computer program stored on a storage medium and comprising computer executable instructions for causing a computer to decode a set of data according to claim 1 or 2.

16. A storage medium according to claim 12, wherein said storage medium is detachably mountable on a device for decoding a set of data representing physical quantities, the data previously having been coded by means of transforming the data into frequency sub-bands, forming blocks and coding the blocks into codeblocks to be included in a binary stream, the device comprising:

means for reading a request defining a set of data to be decoded;

means for analysing the request in order to determine a first subset of data to be decoded and a second subset which has previously been decoded and stored;

means for projecting the first subset to be decoded onto the frequency sub-bands in order to determine the corresponding codeblocks;

means for extracting the previously determined codeblocks;

means for decoding the extracted codeblocks; and means for reverse transformation of the decoded codeblocks so as to form a first decoded subset.

17. A storage medium according to claim 13, wherein said storage medium is a floppy disk or a CD-ROM.

18. A device for decoding a set of data representing physical quantities, the data previously having been coded by means for forming blocks and means for coding the blocks into codeblocks being included in a binary stream, the device comprising:

means for reading a request defining a set of data to be decoded;

means for analyzing the request in order to determine a first subset of codeblocks to be decoded and a second subset which has previously been decoded and stored;

means for extracting the codeblocks of the first subset; and means for decoding the extracted codeblocks into a decoded subset.

19. A device for decoding a set of data representing physical quantities, the data previously having been coded by means for transforming the data into frequency sub-bands, means for forming blocks and means for coding the blocks into codeblocks being included in a binary stream, the device comprising:

means for reading a request defining a set of data to be decoded;

means for analyzing the request in order to determine a first subset of data to be decoded and a second subset which has previously been decoded and stored;

means for projecting the first subset to be decoded onto the frequency sub-bands in order to determine the corresponding codeblocks;

means for extracting the previously determined codeblocks;

means for decoding the extracted codeblocks; and means for reverse transformation of the decoded codeblocks so as to form a decoded subset.

20. A decoding device according to claim 18 or 19, further comprising means for concatenating the decoded subset with the second subset.

21. A decoding device according to claim 18 or 19, wherein said means for analyzing the request is adapted to take into account the dimension, the position, the resolution and the quality of the set of data to be decoded.

22. A decoding device according to claim 19, wherein said means for projecting the first subset to be decoded is adapted to effect the projection onto frequency sub-bands which are selected according to the resolution of the set of data to be decoded.

23. A decoding device according to claim 18 or 19, wherein said means for extracting a codeblock is adapted to effect the extraction from a memory or from the binary stream.

24. A decoding device according to claim 18 or 19, further comprising:

means for checking whether a first request is currently being processed when a second request is detected;

means for checking whether or not processing of the first request has exceeded an advancement threshold, if a first request currently being processed is detected;

means for stopping the processing of the first request, if the processing has not passed the advancement threshold;

means for awaiting the end of the processing of the first request, if the processing has passed the advancement threshold; and means for processing the second request.

25. A decoding device according to claim 18 or 19, further comprising:

means for putting the extracted codeblocks in a memory; and means for eliminating from the memory codeblocks whose frequency of use is low, if the memory is full.

26. A display device comprising the decoding device according to claim 18 or 19 and further comprising means for displaying the set of decoded data.

27. A device according to claim 18 or 19, wherein the device is included in a first station, the binary stream is stored in a second distant station, and the two stations being adapted to communicate with each other.

28. A device according to claim 18 or 19, wherein said means for reading, analysis, extraction and decoding are comprised by:

a microprocessor;

a read only memory containing a program for processing the data; and a random access memory containing registers adapted to store variables modified during the execution of the program.

29. A digital signal processing apparatus comprising the device according to claim 18 or 19.

* * * * *

UNITED STATES PATENT AND TRADEMARK OFFICE

CERTIFICATE OF CORRECTION

PATENT NO. : 6,937,769 B2
APPLICATION NO. : 09/983877
DATED : August 30, 2005
INVENTOR(S) : Patrice Onno It is certified that error appears in the above-identified patent and that said Letters Patent is hereby corrected as shown below:

COLUMN 5:

Line 53, “diskette,” should read --a diskette,--.

COLUMN 8:

Line 19, “is for” should read --is, for--.
Line 20, “example displayed.” should read --example, displayed.--.

COLUMN 11:

Line 29, “$LH_3$, $LH_3$” should read --$HL_3$, $LH_3$--.

COLUMN 12:

Line 50, “codelocks” should read --code blocks--.

Signed and Sealed this

Twenty-fourth Day of October, 2006

JON W. DUDAS
*Director of the United States Patent and Trademark Office*